(No Model.)
L. RASTETTER.
RIM JOINT FOR VEHICLE WHEELS.
No. 548,221. Patented Oct. 22, 1895.
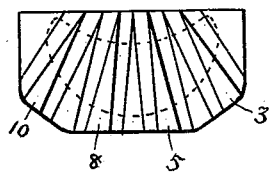
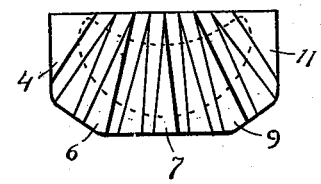
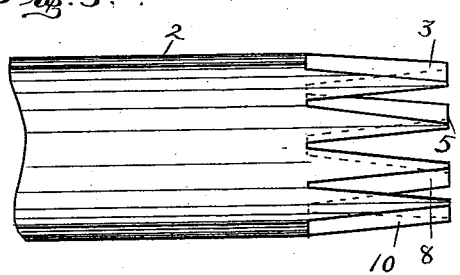
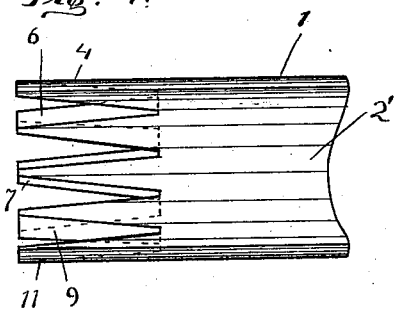
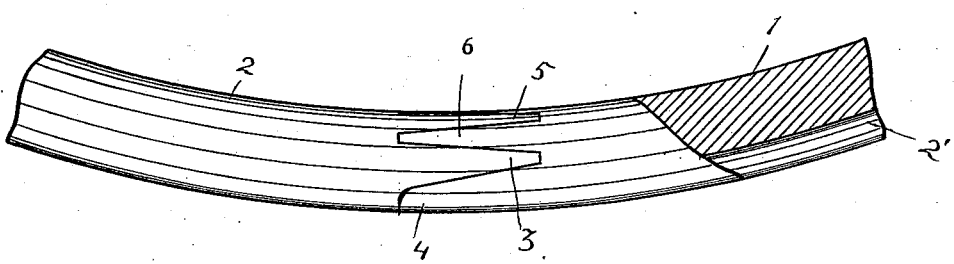
WITNESSES:
Walter G. Burns
Henry P. Kramer
Louis Rastetter  INVENTOR
By Chapin & Denny
his ATTORNEYS.

UNITED STATES PATENT OFFICE.

LOUIS RASTETTER, OF FORT WAYNE, INDIANA.

RIM-JOINT FOR VEHICLE-WHEELS.

SPECIFICATION forming part of Letters Patent No. 548,221, dated October 22, 1895.

Application filed May 27, 1895. Serial No. 550,797. (No model.)

*To all whom it may concern:*

Be it known that I, LOUIS RASTETTER, a citizen of the United States, residing at Fort Wayne, in the county of Allen, in the State of Indiana, have invented certain new and useful Improvements in Rim-Joints for Vehicle-Wheels; and I do hereby declare that the following is a full, clear, and exact description of the invention, which will enable others skilled in the art to which it appertains to make and use the same, reference being had to the accompanying drawings, which form part of this specification.

My invention relates to improvements in rim-joints for vehicle-wheels, specially adapted and designed for wooden bicycle-rims.

The object of my invention is to provide an interlocking joint for wooden rims for bicycle-wheels, so constructed and arranged that the interlocking parts are radial from a common center without the rim, and so united when in position as to be secure against either vertical or lateral displacements without even the use of glue. The interlocking tenons are so constructed as to preserve for the rim at the joint the greatest strength possible, and the abutting ends are so united that each tenon in the joint acts like a keystone in an arch, and when united conform to the general contour of the rim.

Another object of my improvement is to provide a rim-joint for bicycle-wheels which is not only substantial and secure against displacement by ordinary usage, but which can be economically, readily, and accurately made by machinery.

The novel feature of my invention consists in the construction and arrangement of the interlocking and outwardly-tapering tenons, all of which are transversely radial to a common center without the rim and have plane sides, whereby they can be readily and accurately sawed. Each of the series of tenons is embraced in a locked engagement by a pair of the abutting series of tenons, by which construction each of the said tenons is arch-shaped, and when driven home will fully preserve the strength of the rim at the joint.

In the accompanying drawings, forming part of this specification, similar figures of reference indicate similar parts throughout the several views.

Figure 1 is an end view of one of the meeting rim ends in the rough, showing the radial arrangement of the interlocking tenons and also showing in dotted outline the comparative form and size of the finished rim. Fig. 2 is an end view of the other meeting rim end, also in the rough, showing the same features as in Fig. 1. Fig. 3 is a plan of one of the meeting rim ends in its finished form, showing the arrangement of the registering tenons. Fig. 4 is a plan of the other meeting rim end in its finished form. Fig. 5 is a side view of my improved joint with the interlocking rim ends in engagement, one end being cut away to show the grooved perimeter 2'.

The wooden rim shown in the drawings is of the usual cancavo-convex form in common use for bicycle-wheels, preferably made of one piece of wood, and the abutting ends and interlocking tenons when in engagement preserve for the joint the general contour of the rim.

The abutting rim end 1, Fig. 4, is provided with a series of outwardly-tapering wedge-shaped tenons 6, 7, and 9, whose lower convex face is of a greater width than that of the upper concave face thereof, as seen in Fig. 2, and whose opposite sides are uniformly radial to a common center. The said tenons are also radial to a common center without the rim and are of a uniform length. The said end 1 is also provided with a pair of exterior tenons 4 and 11, whose outer face conforms to the contour of the rim. The other abutting rim end 2 is also provided with a series of wedge-shaped outwardly-tapering tenons 3, 5, 8, and 10, of uniform length, and which are adapted to interlock with and be embraced by the said tenons of the abutting end 1. The said tenons of the rim end 2 are likewise radial to a common center without the rim, and have their lower convex face of a greater width than their upper concave face, as seen in Fig. 1. Each of the said rim ends has a series of longitudinal inwardly-tapering mortises corresponding in all respects with the tenons of the abutting rim end and adapted to receive and embrace the same, as seen in Fig. 5. The said registering and interlocking tenons for use upon the ordinary bicycle-wheel rim are preferably about one inch in length, which practical use has demonstrated to give the greatest strength to the joint consistent with a proper regard for the strength of the rim, though they may be made of any desired length.

It is obvious that on account of making each tenon wider upon its lower face or edge than upon its upper face the said tenons will be united and interlocked upon the principle of an arch, each tenon acting as a keystone in the arch, thereby preventing vertical displacement, even when they are withdrawn over half way from their engagement, because of their arch-like arrangement.

My improved joint is thus secure against either lateral or vertical derangement when in use, particularly when properly glued.

It is also obvious that my improved joint can be readily adapted to other vehicle-rims.

Having thus described my invention and the manner of employing the same, what I claim as my invention, and desire to secure by Letters Patent, is—

1. A vehicle rim-joint consisting of two interlocking ends or sections adapted to form a locked union, as shown, and preserving the general contour of the rim, one of the said ends having a series of outwardly tapering tenons arranged radial to a common center without the rim as described, and adapted to register with a series of corresponding mortises in the other end of the rim or abutting section, all substantially as described.

2. A joint for vehicle-rims comprising two interlocking ends or sections, one of the said ends having a series of inwardly-tapering longitudinal mortises, as shown, a series of outwardly tapering tenons 6, 7 and 9 having a radial arrangement, as described adapted to register with a corresponding series of mortises in the other interlocking end, and the external arms or tenons 4 and 11 for the purpose described, the other interlocking end or section having a series of outwardly-tapering tenons 3, 5, 8 and 10 also having a radial arrangement adapted to register with the said mortises and a series of mortises adapted to receive the said tenons of the abutting rim-end, all substantially as described.

3. In a joint for vehicle rims, the combination of one interlocking end or section having the exterior tenons 4 and 11 adapted to embrace the abutting end or section, a series of longitudinal mortises having radial sides, and a series of radial tenons adapted to register with a series of corresponding mortises in the abutting end or section, with another interlocking end or section having a series of radial tenons adapted to register with the said mortises of the other abutting end, and having a series of mortises adapted to receive the said radial tenons, all substantially as described.

Signed by me at Fort Wayne, Allen county, Indiana, this 23d day of May, A. D. 1895.

LOUIS RASTETTER.

Witnesses:
FLAVIUS J. YOUNG,
WALTER G. BURNS.